(12) United States Patent
Razin et al.

(10) Patent No.: US 12,002,454 B2
(45) Date of Patent: Jun. 4, 2024

(54) METHOD AND APPARATUS FOR INTENT RECOGNITION AND INTENT PREDICTION BASED UPON USER INTERACTION AND BEHAVIOR

(71) Applicant: SWAMPFOX TECHNOLOGIES, INC., Columbia, SC (US)

(72) Inventors: Sergey A. Razin, Columbia, SC (US); Robert S. Cooper, Irmo, SC (US); Rick Ulmer, Columbia, SC (US); Tom Hanson, Columbia, SC (US)

(73) Assignee: Swampfox Technologies, Inc., Columbia, SC (US)

( * ) Notice: Subject to any disclaimer, the term of this patent is extended or adjusted under 35 U.S.C. 154(b) by 19 days.

(21) Appl. No.: 17/126,703

(22) Filed: Dec. 18, 2020

(65) Prior Publication Data

US 2021/0193124 A1 Jun. 24, 2021

Related U.S. Application Data

(60) Provisional application No. 62/951,497, filed on Dec. 20, 2019.

(51) Int. Cl.
| | | |
|---|---|---|
| G10L 15/00 | (2013.01) |
| G10L 15/06 | (2013.01) |
| G10L 15/18 | (2013.01) |
| G10L 15/22 | (2006.01) |
| G10L 15/30 | (2013.01) |
| G10L 15/02 | (2006.01) |
| G10L 15/183 | (2013.01) |

(52) U.S. Cl.
CPC .......... *G10L 15/18* (2013.01); *G10L 15/063* (2013.01); *G10L 15/22* (2013.01); *G10L 15/30* (2013.01); *G10L 15/02* (2013.01); *G10L 15/1822* (2013.01); *G10L 15/183* (2013.01); *G10L 2015/225* (2013.01)

(58) Field of Classification Search
CPC ....... G10L 15/22; G10L 15/02; G10L 15/063; G10L 15/16; G10L 25/30; G10L 15/08; G10L 15/26; G10L 15/1822; G10L 15/183; G10L 15/19; G10L 15/193; G10L 19/005; G10L 19/00; G10L 25/27; G10L 15/07; G10L 15/20; G10L 15/30; G06F 40/30
See application file for complete search history.

(56) References Cited

U.S. PATENT DOCUMENTS

| | | | |
|---|---|---|---|
| 9,495,962 B2 * | 11/2016 | Govrin | G10L 15/22 |
| 10,750,019 B1 * | 8/2020 | Petrovykh | H04M 3/58 |
| 10,902,207 B2 * | 1/2021 | Guerra | G06K 9/6256 |

(Continued)

*Primary Examiner* — Vu B Hang
(74) *Attorney, Agent, or Firm* — Duquette Law Group

(57) ABSTRACT

Embodiments of the innovation relate to, in a contact center apparatus, a method for recognizing user intent associated with user interaction with the contact center apparatus. The method includes receiving user interaction data; performing a feature extraction process on the user interaction data to generate feature data; performing an intent extraction operation on the feature data to extract topics included with the feature data; executing a classification engine on the topics extracted from the feature data to classify a user intent associated with the user interaction data; and directing the user to a corresponding working agent based upon the classified user intent

14 Claims, 8 Drawing Sheets

(56) References Cited

U.S. PATENT DOCUMENTS

| | | | |
|---|---|---|---|
| 2014/0044243 A1* | 2/2014 | Monegan | H04M 3/5166 |
| | | | 379/88.01 |
| 2017/0300533 A1* | 10/2017 | Zhang | G06F 16/9536 |
| 2020/0034874 A1* | 1/2020 | Narayan | G06Q 30/0277 |
| 2021/0125025 A1* | 4/2021 | Kuo | G06N 5/04 |

* cited by examiner

METHOD AND APPARATUS FOR INTENT RECOGNITION AND INTENT PREDICTION BASED UPON USER INTERACTION AND BEHAVIOR

RELATED APPLICATIONS

This patent application claims the benefit of U.S. Provisional Application No. 62/951,497, filed on Dec. 20, 2019, entitled, "Method and Apparatus for Intent Recognition and Intent Prediction Based Upon User Interaction and Behavior," the contents and teachings of which are hereby incorporated by reference in their entirety.

BACKGROUND

Enterprises typically utilize interactive systems to receive and distribute incoming customer omnichannel communications, such as calls, and to automate user access to the enterprise. For example, conventional interactive systems can provide phone-based access to an information resource associated with the enterprise, such as an email system or database. Conventional interactive systems can also route a user to a particular human resource within the enterprise, such as to a person in customer service.

Enterprises can utilize certain interactive systems, such as Interactive Voice Response (IVR) systems, to handle an enterprise's remote customer interactions with minimal, if any, human intervention. By handling some of the routine data gathering activities prior to involvement by a contact center agent, an IVR system can offload contact center agents to save on costs and can provide an efficient way for the customer to obtain routine information. For example, a bank can utilize an IVR system to gather caller data and to provide the caller with information, such as a bank balance, without requiring the involvement of a human agent.

SUMMARY

Conventional interactive systems can suffer from a variety of deficiencies. For example, conventional interactive systems such as speech recognition-based systems (e.g., IVR and speech recognition or Intelligent Voice Automation (IVA) systems) allow for the identification of the characteristics of a user's speech. However, these systems fail to consider the entire context of the incoming user speech, and, as such, do not identify the user's intent.

By contrast to conventional interactive systems, embodiments of the present innovation relate to a method and apparatus for intent recognition and intent prediction based upon user interaction. Identification of a user's intent can allow the enterprise to predict the customer's needs and to tailor future actions and services to these needs. In one arrangement, to improve on the accuracy of determining a user's intent, a contact center apparatus is configured to identify the intent associated with a user's interaction data, which can include speech utterances, grammar, past behavior, demographic data, public record data, and/or social media history, for example.

Further, the contact center apparatus can include an AI-driven intent prediction engine which, based on the user's interaction data (e.g., status, state, location, social platform data, CRM, etc.), can dynamically forecast or predict a next best action that can be provided to the user to enhance the user's customer experience. For example, the next best action can include the automated rebooking of a flight because the user's flight status, the automatic handling of a bill payment or payment arrangement if a bill is overdue, or the automatic release of a discount to proactively address a user experience issue. Further, the next best action can address a user issue prior to the user attempting to contact the enterprise (e.g., company/brand). As such, the contact center apparatus can raise the user experience beyond that achieved with traditional interactive systems.

This process can be used for, and is not limited to, reporting as well as subsequent training (e.g., reinforcement) of the model for systems, such as natural language understanding systems. In addition, the embodiment based on the extraction of the intent is able to predict the next best action that can provide a user with the best and most efficient experience with an enterprise.

In one arrangement, embodiments of the innovation relate to, in a contact center apparatus, a method for recognizing user intent associated with user interaction with the contact center apparatus. The method includes receiving user interaction data; performing a feature extraction process on the user interaction data to generate feature data; performing an intent extraction operation on the feature data to extract topics included with the feature data; executing a classification engine on the topics extracted from the feature data to classify a user intent associated with the user interaction data; and directing the user to a corresponding working agent based upon the classified user intent In one arrangement, embodiments of the innovation relate to, in a contact center apparatus, a method for predicting user intent associated with user interaction with the contact center apparatus. The method includes receiving user interaction data; transforming the user interaction data into a prediction vector; providing the prediction vector and a prediction model to a framework; and receiving an intent prediction and a confidence score from the framework based upon the prediction vector and the prediction model.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a method and apparatus for intent recognition and intent prediction based upon user interaction. Identification of a user's intent can allow the enterprise to predict the customer's needs and to tailor future actions and services to these needs. In one arrangement, to improve on the accuracy of determining a user's intent, a contact center apparatus is configured to identify the intent associated with a user's interaction data, which can include speech utterances, grammar, past behavior, demographic data, public record data, and/or social media history, for example.

Further, the contact center apparatus can include an AI-driven intent prediction engine which, based on the user's interaction data (e.g., status, state, location, social platform data, CRM, etc.), can dynamically forecast or predict a next best action that can be provided to the user to enhance the user's customer experience. For example, the next best action can include the automated rebooking of a flight because the user's flight status, the automatic handling of a bill payment or payment arrangement if a bill is overdue, or the automatic release of a discount to proactively address a user experience issue. Further, the next best action can address a user issue prior to the user attempting to contact the enterprise (e.g., company/brand). As such, the contact center apparatus can raise the user experience beyond that achieved with traditional interactive systems.

Figure 1:
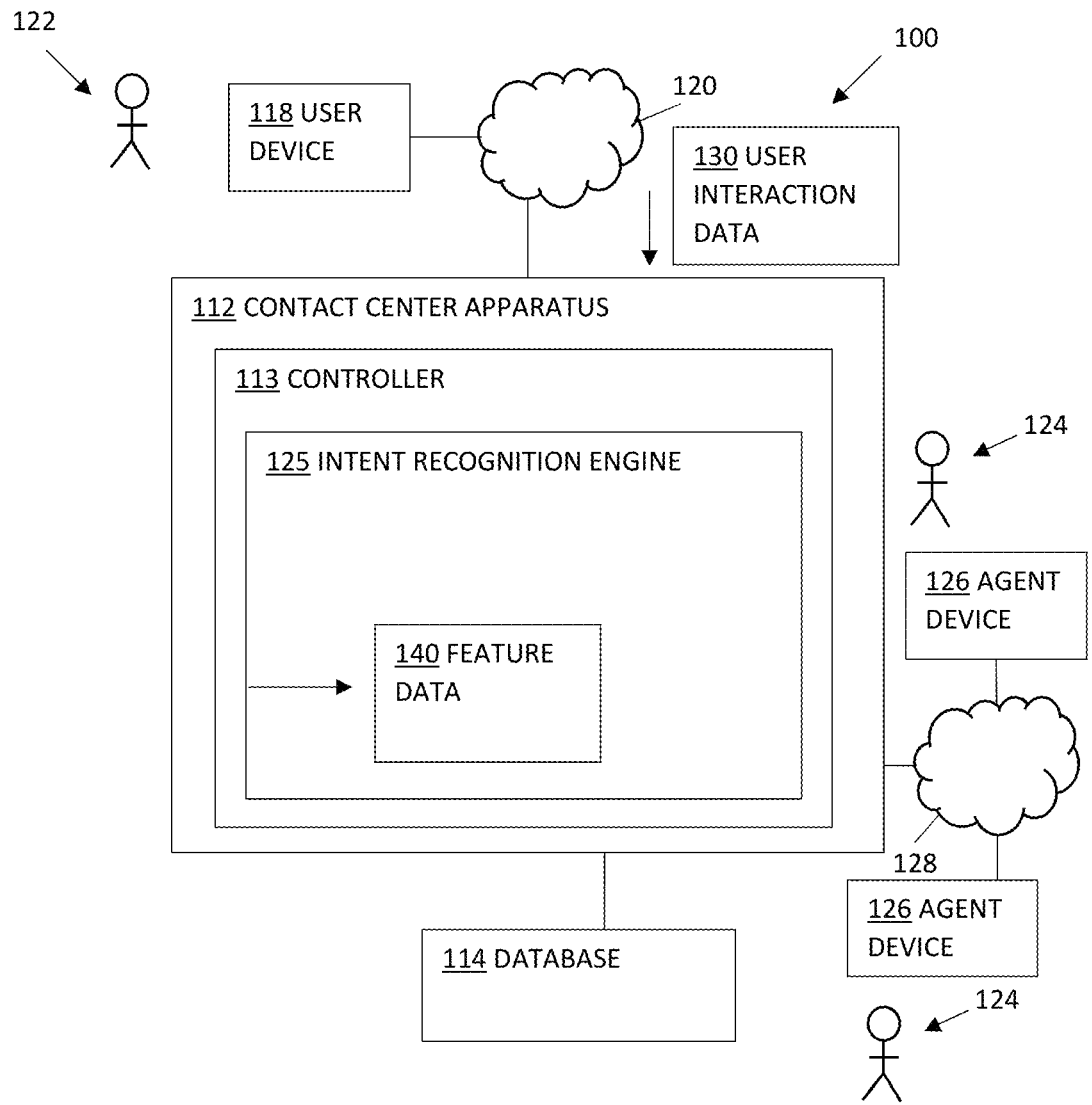
FIG. 1 illustrates a schematic representation of a contact center, according to one arrangement.

FIG. 1 illustrates a schematic representation of a contact center 100, according to one arrangement. The contact center 100 can include a contact center apparatus 112, such as a server device, disposed in electrical communication with one or more data stores or databases 114.

The contact center apparatus 112 can be a computerized device having a controller 113, such as a processor and memory. According to one arrangement, the contact center apparatus 112 is disposed in electrical communication with a user device 118, such as a telephone, smartphone, or tablet device, via a network 120, such as a local area network (LAN), a wide area network (WAN), or a public switched telephone network (PSTN). The contact center apparatus 112 can be configured to store information regarding the user to the database 114. For example, the contact center apparatus 112 can store user-related information for each communication session, such as speech, text, facial recognition, and/or GPS information. In another example, the contact center apparatus 112 can store other information related to the user, such as CRM data, billing data, help desk data, service data, social media data, and/or demographics data.

The controller 113 of the contact center apparatus 112 can be configured with an intent recognition engine 125. During execution of the intent recognition engine 125, the contact center apparatus 112 is configured to recognize a user's intent based upon the content of user interaction data 130 received from a user or customer 122. Based upon the identified intent, the contact center apparatus 112 can direct the user 122 of the user device 118 to an appropriate working agent 124 for service. Each working agent 124 can operate a corresponding computer work station 126, such as a personal computer, telephone, tablet device or other type of voice communications equipment, all interconnected by a network 128, such as a LAN or WAN 128.

Figure 2:
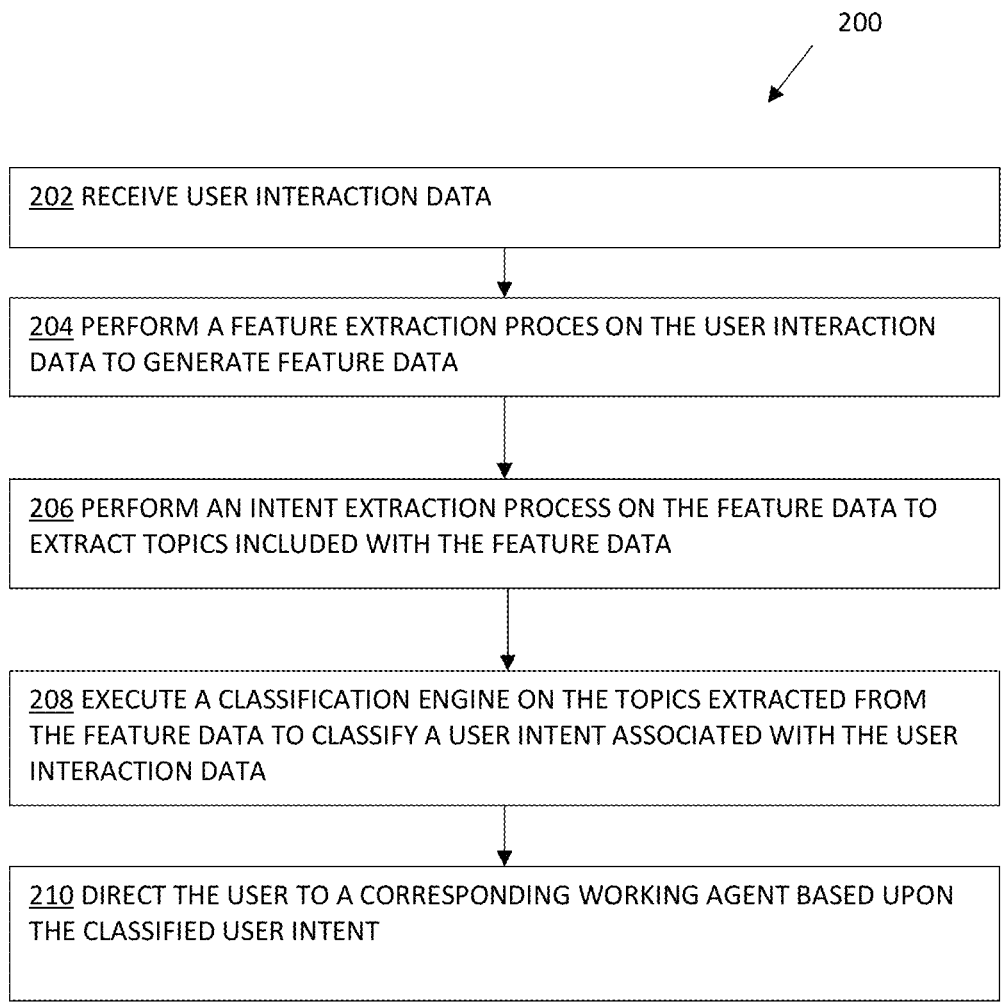
FIG. 2 illustrates a flowchart showing a process performed by the contact center apparatus of FIG. 1, according to one arrangement.

FIG. 2 illustrates a flowchart 200 of a process performed by the contact center apparatus 112 when identifying user intent.

In element 202, the contact center apparatus 112 receives user interaction data 130. While the user interaction data 130 can be configured in a variety of ways, the user interaction data 130 can identify some aspect of the user 122 or the user's interaction with the contact center 100. In one arrangement, with reference to FIG. 1, the contact center apparatus 112 can receive the user interaction data 130 from the user device 118. For example, the contact center apparatus 112 can receive the user interaction data 130 from an omnichannel device, such as a mobile device, where the user interaction data 130 can include chat, website, voice, text, SMS, or voice assist information. In another arrangement, the contact center apparatus 112 can alternately receive the user interaction data 130 from the database 114. For example, the database 114 can store user-related data as the user interaction data 130, such as speech, text, facial recognition, and/or customer GPS. In another example, the database 114 can store user-relevant data as the user interaction data 130, such as CRM, billing, or service data associated with the user 122.

Returning to FIG. 2, in element 204, the contact center apparatus 112 performs a feature extraction process on the user interaction data 130 to generate feature data 140. The feature data 140 identifies words or information within the user interaction data 130 having a relatively high level of importance and is utilized by the contact center apparatus 112 in identifying the user's intent.

Figure 3:
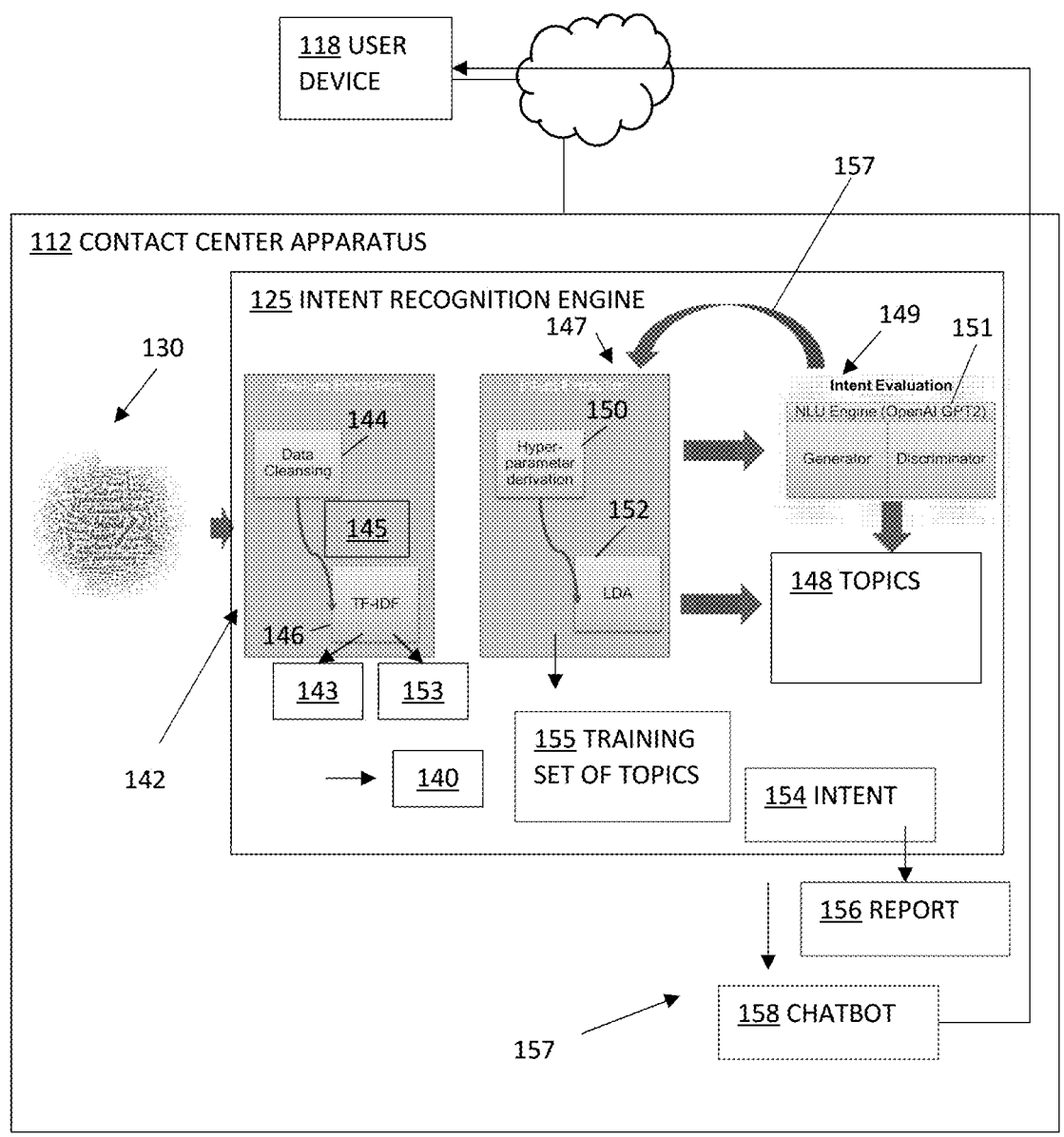
FIG. 3 illustrates a schematic representation of the contact center apparatus of FIG. 1 having an intent recognition engine, according to one arrangement.

In one arrangement, during a feature extraction process 142 as shown in FIG. 3, the contact center apparatus 112 is configured to utilize a data cleansing engine 144 to reduce the size of the data set included in the user interaction data 130. For example, in the case where the user interaction data 130 includes speech or text, the contact center apparatus 112 can utilize, as the data cleansing engine 144, a tokenizer to remove non-words (e.g., characters, sounds, etc.) from the user interaction data 130 and to divide the remaining content of the user interaction data 130 into a sequence of words or units of data. Application of the data cleansing engine 144 by the contact center apparatus 112 generates cleansed user interaction data 145.

Following application of the data cleansing engine 144, the contact center apparatus 112 can apply, as part of the feature extraction process 142, a feature importance engine 146 on the cleansed user interaction data 145 to identify statistically-important words associated with the user interaction data 145. For example, the contact center apparatus 112 can include a term frequency-inverse document frequency (TF-IDF) engine 146 which is executable relative to the user interaction data 145 to identify statistical word importance of the elements within the data 145. Generally, with the concept of term frequency-inverse document frequency, a word's importance can increase statistically in proportion to the number of times the word appears within a document. However, the importance of the word can be decreased by the frequency of occurrence of the word within a collection of documents relating to a particular topic, or corpus. For example, certain words such as "the," "to," and "is" can appear frequently within both a document and a collection of documents. As such, the relative importance of these words within a document is offset by the frequency of occurrence of these words within the collection of documents. The TF-IDF engine 146 can account for both of these phenomena.

During application of the TF-IDF engine 146, the contact center apparatus 112 first identifies the number of times each word or term appears within the user interaction data 145 to generate a corresponding term frequency value for each word. Next, the TF-IDF engine 146 can generate a normalized term frequency value 143 by dividing the term frequency value for each word by the total number of words within the user interaction data 145. With further execution by the contact center apparatus 112, the TF-IDF engine 146 generates an inverse document frequency value 153 for each term within the data 145. For example, to generate the inverse document frequency value 153 for each term, the TF-IDF engine 146 can generate a logarithm of the ratio of a total number of sets of user interaction data 130 received by the contact center apparatus 112 relative to a number of sets of user interaction data 130 which contains each term.

The contact center apparatus 112 is further configure to apply the TF-IDF engine 146 to identify a weight value for each word within the user interaction data 145. For example, the TF-IDF engine 146 can calculate the weight of each word within the user interaction data 145 as the product of the normalized term frequency value 143 and the inverse document frequency value 153. The contact center apparatus 112 can then compare the weight value for each word within the user interaction data 145 with a threshold importance value. For words having a weight value that meets the threshold importance value, the contact center apparatus 112 can store those words as feature data 140 associated with the user 122.

Returning to FIG. 2, in element 206, the contact center apparatus 112 performs an intent extraction process 147 on the feature data 140 to extract topics 148 included within the feature data 140. The feature data 140 can include a relatively small number of words which are ranked as important (e.g., words which meet the threshold importance value). Correlations among the important words can define a relatively small number of topics associated with the feature data 140. Therefore, with reference to FIG. 3, during performance of the intent extraction process 147, the contact center apparatus 112 is configured to identify words that appear relatively frequently in the feature data 140, as provided during the feature extraction process 142, as well as the correlations among these words. Based upon the frequency of occurrence and the correlation of the words, the contact center apparatus 112 can identify the topics 148 contained within the feature data 140.

In one arrangement, when performing the intent extraction process 147 on the feature data 140, the contact center apparatus 112 can be configured to utilize a Gensim's Latent Dirichlet Allocation (LDA) model 152. The LDA model 152 is an algorithm configured to model unidentified topics within a relatively large amount of text, such as provided by the feature data 140. In use, the LDA model 152 can identify groupings of relatively important keywords within the feature data 140 to identify particular topics. As a result of the execution of the LDA model 152, the contact center apparatus 112 generates a list of topics 148 associated with the user interaction with the contact center 100.

A conventional LDA model provides that for a set of M documents, each containing N words associated with a topic of a set of K topics, a joint posterior probability can be calculated for the hyper-parameters: $\alpha$ which is a ratio that identifies a number of topics per document; $\beta$ which is a ratio that identifies the number of words per topic; and k which identifies the number of topics per document.

In one arrangement, the contact center apparatus 112 is configured to derive the best or optimal hyper-parameters $\alpha$, $\beta$, and k for the feature data 140. For example, the contact center apparatus 112 can execute a hyper-parameter derivation function 150, such as a coherence score function, to evaluate the generated LDA model 152 and identify the optimal hyper-parameters for a variety of LDA models. A topic coherence score identifies the level of similarity among high-scoring words of a given topic and helps to distinguish topics which are considered as being semantically interpretable from those which are uninterpretable or are statistical artifacts. In certain cases, the topics 148 generated by the contact center apparatus 112 during application of the LDA model 152 may not be interpretable. Accordingly, the contact center apparatus 112 can utilize the coherence score to determine the hyper-parameters that provide topics which can be interpretable from those which are not interpretable.

During operation, when executing the intent extraction process 147, the contact center apparatus 112 is configured to select a range of values for each of the hyper-parameters $\alpha$, $\beta$, and k and execute the LDA model 152 relative to the feature data 140 for each selected value and for each parameter. For example, the contact center apparatus 112 can select a value for each hyper-parameter within a range of between 0 and 100. Next, the contact center apparatus 112 can sequentially execute the LDA model 152 for each of these selected hyper-parameter values by incrementing a value of one hyper-parameter while maintaining the values of the remaining hyper-parameters as constant.

Figure 4A:
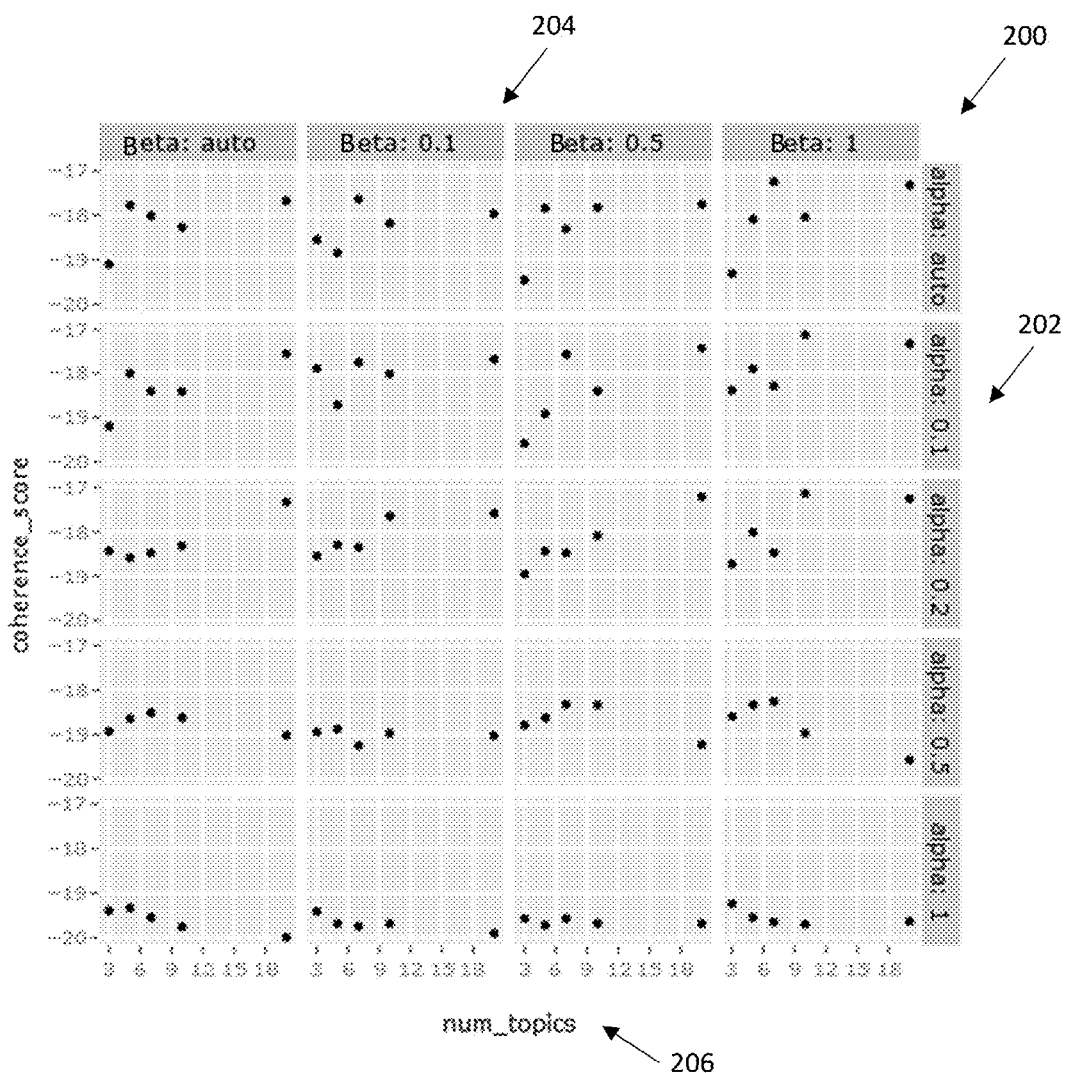
FIG. 4A is a graph showing the relationship between coherence scores and topics for various hyper-parameters of an LDA model, according to one arrangement.
Figure 4B:
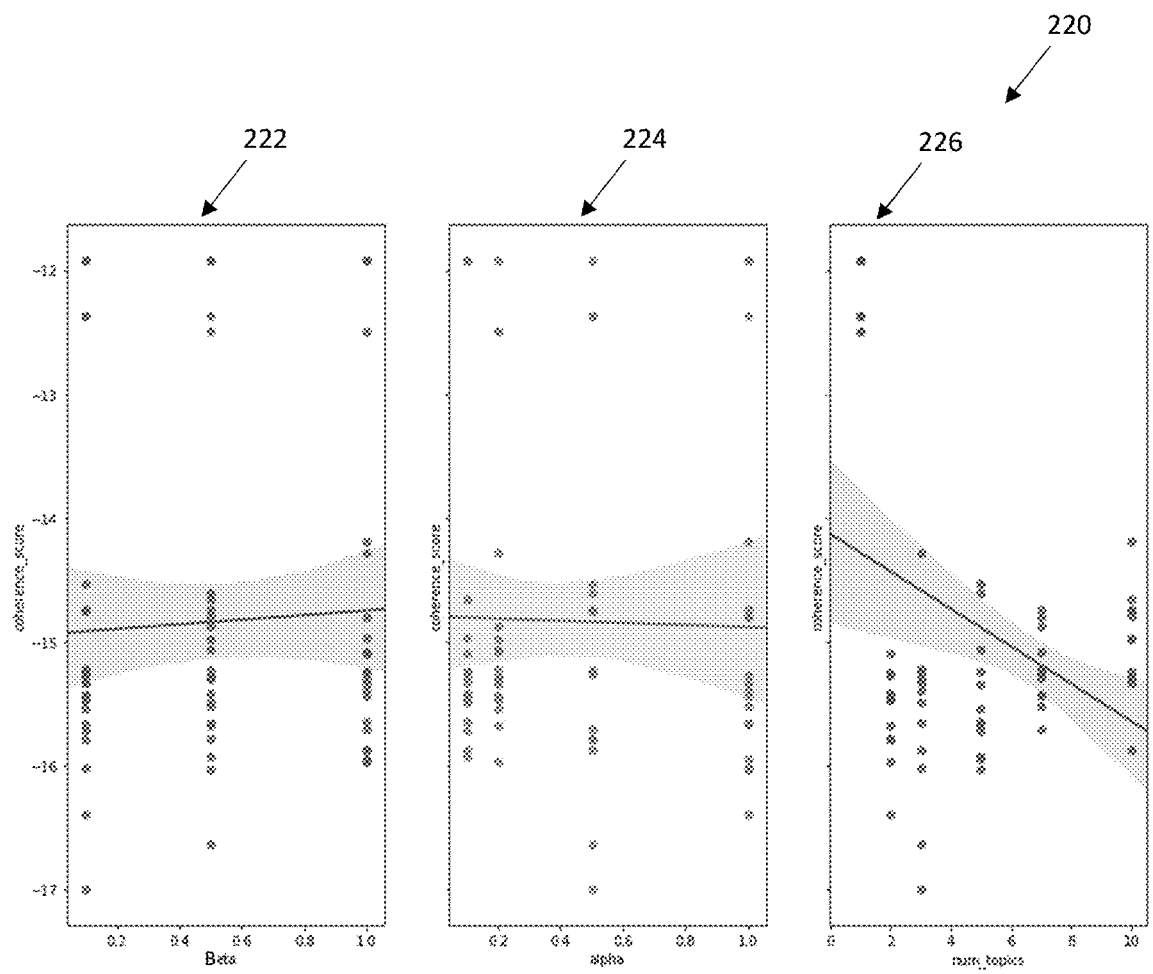
FIG. 4B is a graph showing coherence scores for a variety of parameters, according to one arrangement.

The contact center apparatus 112 is configured to apply the coherence score function to each resulting LDA model 152 to identify the coherence scores for each of the hyper-parameters $\alpha$, $\beta$, and k. For example, the chart 200 illustrated in FIG. 4A identifies the coherence scores for LDA models 152 having constant $\beta$ values 204 of 0.1, 0.5, and 1.0; constant $\alpha$ values 202 of 0.1, 0.2, 0.5, and 1.0; and constant k values between 3 and 20. From these results, as shown in the graph 220 of FIG. 4B, the coherence score function 150 can identify the coherence scores for $\beta$ values 222 within the range of 0.1 and 1.0, coherence scores for $\alpha$ values 224 between 0.1 and 1.0, and coherence scores for a topic (k) 226 range between 0 and 10.

Figure 4C:
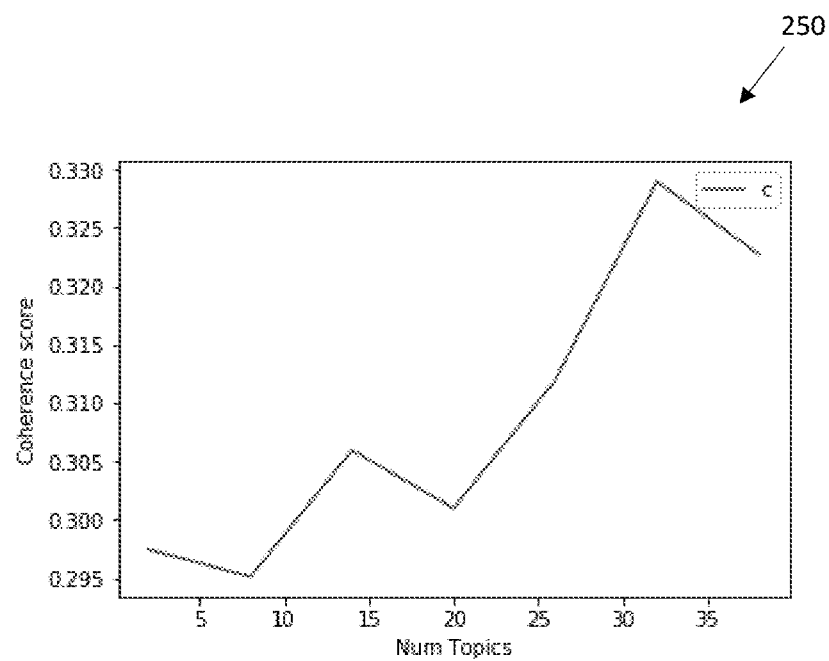
FIG. 4C is a graph showing a relationship between coherence score and a number of topics, according to one arrangement.

Based upon these resulting coherence scores 220, the contact center apparatus 112 can identify the optimal hyper-parameter values for the LDA model 152 of the feature data 140. For example, FIG. 4C is a chart 250 which illustrates the coherence score for a number of topics k with a fixed $\beta$ value within the range of 0.1 and 1.0 and a fixed $\alpha$ value within the range of 0.1 and 1.0. The chart 250 shows that a general increase in coherence score with an increase in the number of topics but with a decline between 15 and 20 topics. Based upon these results, the contact center apparatus 112 can select the number of topics k=33 because of the relatively high coherence score. Following this selection, the contact center apparatus 112 can identify the $\alpha$ and $\beta$ values that produced the maximum coherence score for k=33 and can train the final LDA model 152 using these $\alpha$ and $\beta$ values. Such training of the LDA model 152 generates the list of topics 148 associated with the user interaction with the contact center 100 and based upon the feature data 140.

Returning to FIG. 2, in element 208, the contact center apparatus 112 executes a classification engine 149 on the topics 148 extracted from the feature data 140 to classify a user intent 154 associated with the user interaction data 130. For example, with reference to FIG. 3, assume the case where the contact center apparatus 112 has identified the following three topics 148 as a result of the performance of the intent extraction process 147: "I need to pay my bill," "I want to start service," and "I want to view my balance."

Based upon these extracted topics 148, when executing the classification engine 149, the contact center apparatus 112 can review the topics 148 and can assign or classify each of the topics 148 with a respective intent 154, such as: "pay bill," "start service," and "pay balance." While the classification engine 149 can be configured in a variety of ways, in one arrangement as indicated in FIG. 3, the classification engine 149 is a Natural Language Understanding tool which is a language processing engine.

As provided above, following application of the LDA model 152 to the feature data 140, the contact center apparatus 112 can classify the intents associated with the topics 148 derived from the feature data 140. In certain cases, however, there can be some imprecision or misclassification associated with the topics 148 generated via execution of the LDA models 152. To overcome this imprecision, in one arrangement, the contact center apparatus 112 is configured to utilize the classification engine 149 in order to verify the classification of the topics 148 generated by the LDA models 152.

In one arrangement, with reference to FIG. 3, the contact center apparatus 112 can utilize a natural language understanding (NLU) engine 151 of the classification engine 149, such as OpenAI GPT2, to confirm the accuracy of the classification of the topics 148 associated with the user interaction data 130. For example, the contact center apparatus 112 can train the NLU engine 151 with a first portion of a training set of topics 155 and execute the NLU engine 151 on a second portion of the training set of topics 155. As a result, the NLU engine 151 can assign the second portion of the training set of topics 155 to particular intents. The contact center apparatus 112 can review the results for errors and, if necessary, re-run 157 the LDA model 152 on any mis-matches to identify topics which might be of a different class.

Returning to FIG. 2, in element 208, the contact center apparatus 112 directs the user 122 to a corresponding working agent 124 based upon the classified user intent 154. For example, as provided above, the classification engine 149, can classify each of the topics 148 extracted from the feature data 140 as a respective user intent 154, such as "pay bill," "start service," and "pay balance." Further, with reference to FIG. 1, the contact center 100 can include a number of working agents 124 with each agent 124 responsible to handle a particular responsibility, such as financial or service transactions. Based upon the classified user intents 154 associated with the user interaction data 130 provided by the user, the contact center apparatus 112 can direct the user to the appropriate working agent 124 to address the user's needs.

Further, following the classification of the user intents 154, in one arrangement, the contact center apparatus 112 can generate an output 157 which can be utilized to improve contact center service to the users 122. For example, the output 157 can include an intents report 156 which the contact center apparatus 112 can provide to the enterprise for further analysis. In another example, the contact center apparatus 112 can utilize the user intent 154 to train a chatbot model 158 to interact directly with the user 122 via the user device 118.

As provided above, the contact center apparatus 112 includes an intent recognition engine 125 configured to recognize the user intents 154 that were ether provided by a user 122 through the user interaction data 130. However, such analysis can be considered reactive, rather than proactive. In one arrangement, the contact center apparatus 112 can also be configured to proactively predict the user's intent. Such prediction can be dynamically based on customer's data (e.g., status, state, location, social platform data, CRM, etc.).

Figure 5:
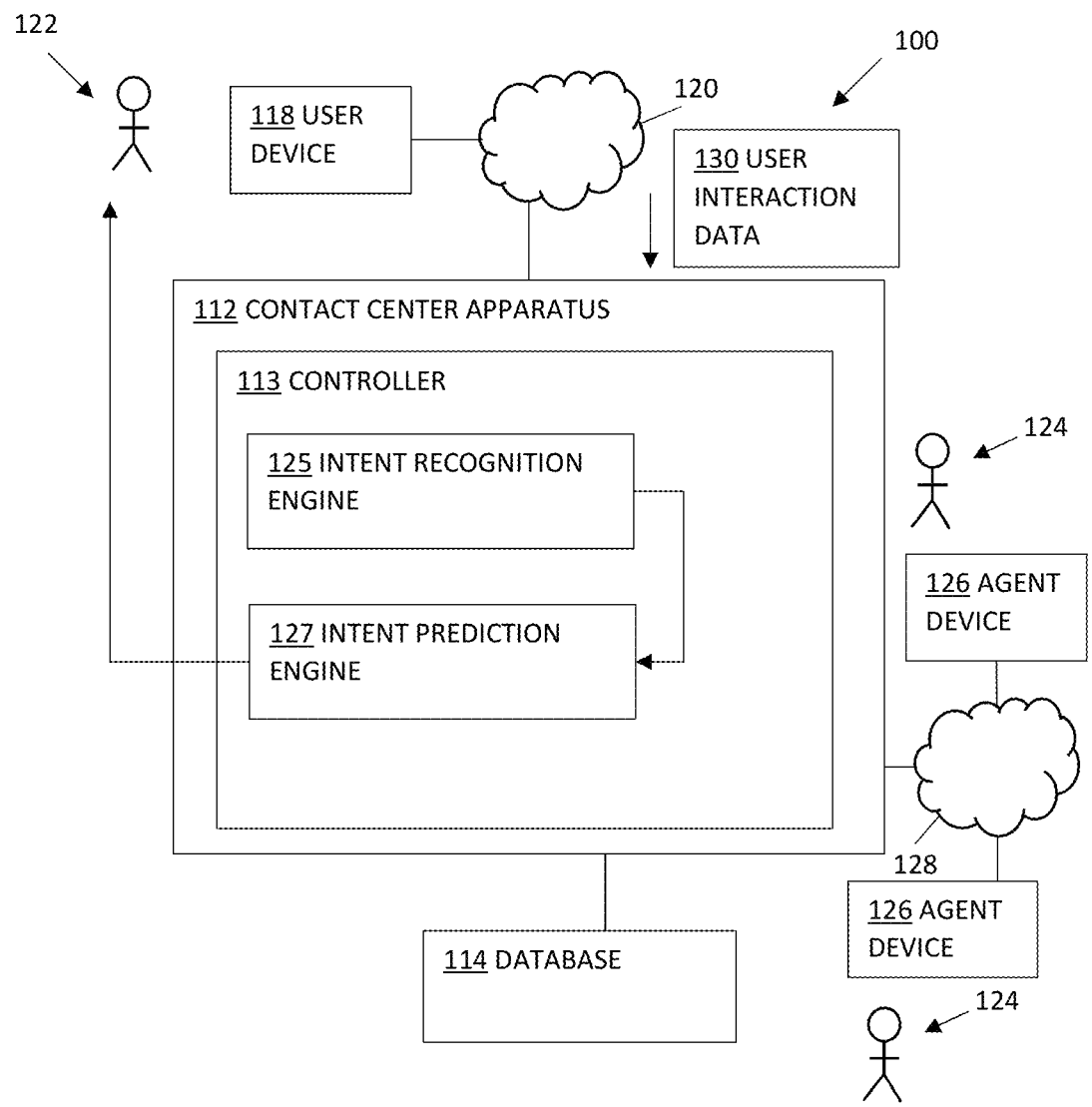
FIG. 5 illustrates a schematic representation of a contact center apparatus of the contact center of FIG. 1, according to one arrangement
Figure 6:
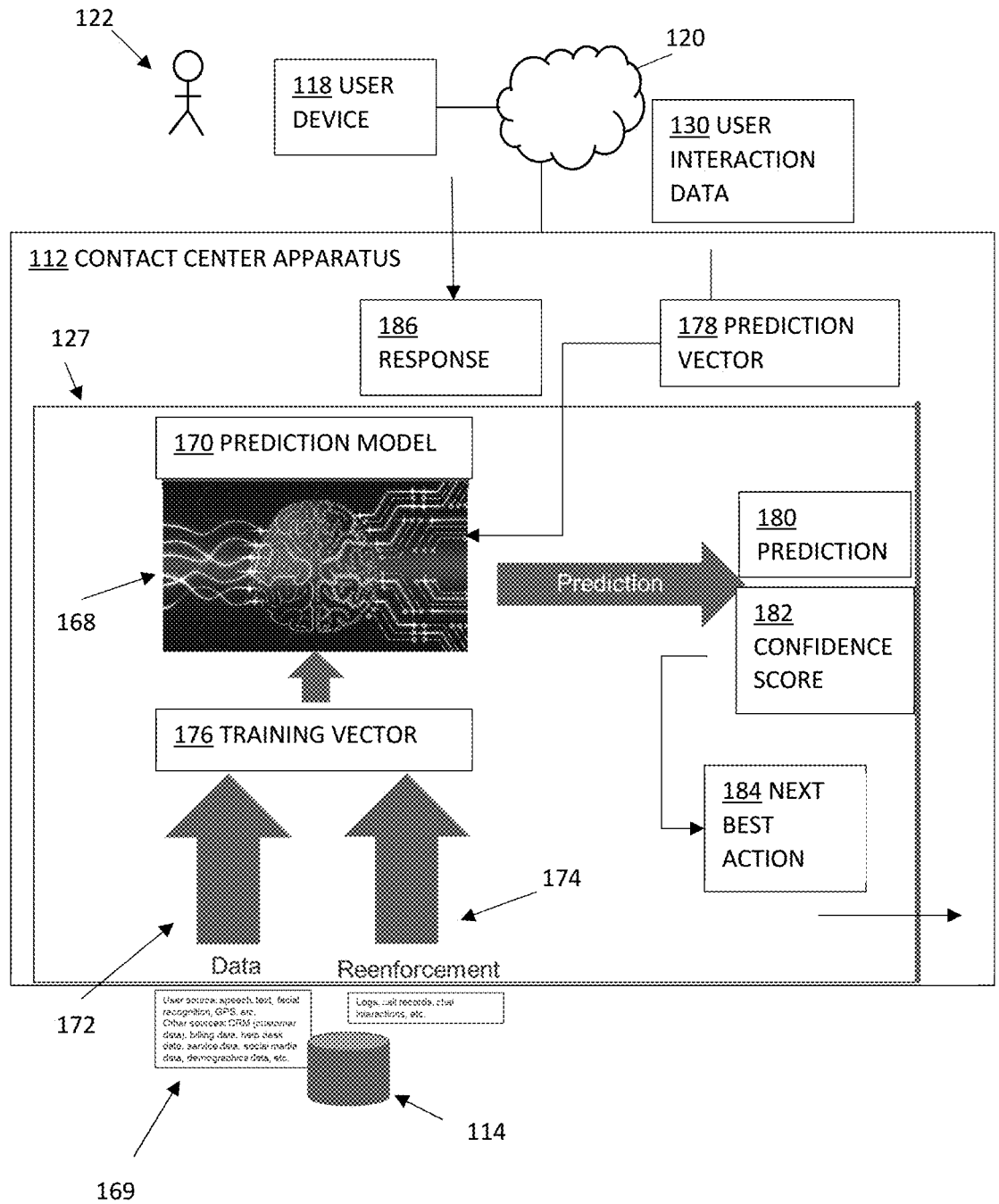
FIG. 6 illustrates an intent prediction engine of the contact center apparatus of FIG. 5, according to one arrangement.

For example, with reference to FIGS. 5 and 6, the contact center apparatus 112 can include an intent prediction engine 127 which can be configured to perform an intent prediction operation on the user interaction data 130 to generate an intent prediction 180. The intent prediction engine 127 can also be configured to identify the best way for the contact center apparatus 112 to handle a user's intent, such as via a next best action 184.

As indicated in FIG. 6, the intent prediction engine 127 includes a framework 168, such as a Deep Learning, Neural Network (e.g., TensorFlow), Boosting, Regression, or Tree type (e.g., Decision, Random forest, etc.) algorithm. The contact center apparatus 112 can train the framework 168 based on historical customer data 169 to generate a prediction model 170. This historical customer data 169 relates to previous customer interactions with the contact center 100 and can include user data (e.g., speech, text, facial recognition, and/or GPS information) and/or user-related data 172 (e.g., CRM data, billing data, help desk data, service data, social media data, and/or demographics data).

For example, during a training operation, the intent prediction engine 127 can retrieve historical customer data 169 from the database 114. Based upon the user behavior identified by the historical customer data 169, the intent prediction engine 127 can provide the intent 154 of the user 122, along with aspects of the historical customer data 169, as part of one or more training vector 176. While the training vectors 176 can have a variety of formats, in one arrangement, each training vector 176 has the format <date/time/season, intent, locality of the callers, number of callers for intent in the queue, de-queue rate, external source information (e.g., social network; weather news, etc.), user (behavior) information>. With this format, an example use case of a training vector 176 can include the following information: <11/24/2019, fall, sales, north-east, 1000, 3 min, twitter: sales announcement; weather: sunny>.

Next during the training operation, the intent prediction engine 127 provides the training vectors 176 to the engine framework 168 to train the framework 168 in order to generate the prediction model 170. As provided above, the framework 168 can include one or more algorithms. With receipt of the training vectors 176, the framework 168 executes the algorithms on the training vectors 176 and provides a prediction model 170 which identifies a user's intent based upon a given set of circumstances.

With the engine framework 168 trained and the prediction model 170 developed, the contact center apparatus 112 can utilize the intent prediction engine 127 to predict a user's intent, based upon the user interaction data 130 received from the user 122. For example, as the user 122 provides user interaction data 130 to the contact center 100, the intent prediction engine 127 transforms the information from the user interaction data 130 into a prediction vector 178. While the prediction vector 178 can have a variety of formats, in one arrangement, each prediction vector 178 has the format <date/time/season, locality of the callers, number of callers for intent in the queue, de-queue rate, external source information (e.g., social network; weather news, etc.), user (behavior) information>. It is noted that the format of the prediction vectors 178 can be similar to the format of the training vector 176 with the exception of an entry for "intent." Next, the contact center apparatus 112 provides the prediction vector 178 and the prediction model 170 to the framework 168 and calls on the framework 168 to generate an intent prediction 180 associated with the user interaction data 130, along with a confidence score 182 which identifies the confidence that the intent prediction 180 is correct.

The intent prediction engine 127 can utilize the intent prediction 180 and confidence score 182 to generate a next best action 184 and can then provide the next best action 184 to the user 122, such as via a chatbot, SMS, IVR, or IVA, for example, to create an optimal customer experience or to enhance the customer experience.

In one arrangement, assume the case where the intent prediction 180 identifies the user's intent as "sales" with a confidence score 182 of 95%. In such a case, the next best action 184 can include a chat or voice response to the user 122, such as follows:
[System]->[User]: Hello, Bob! Would you like to buy our product? (sales intent)
[User]->[System]: YES! (or NO!)
[System]->[User]: I am sorry, what are you calling about? (IF NO) [User]->[System]: Billing (this input can later be used for reinforcement as mentioned further in the document)

In one arrangement, the next best action 184 can include an advertisement directed toward the user or the generation of a report, such as for use by an administrator of the contact center 100.

In one arrangement, the next best action 184 can be an action performed by the contact center 100, such that the contact center apparatus 112 can act on the intent prediction 180. For example, the action performed by the contact center 100 can be an automated status or rebooking of a flight because the flight status, an automatic handling of the bill payment or payment arrangement if the bill is overdue, or an automatic release of a discount to proactively address customer experience issue. In addition, the action performed by the contact center 100 can address a customer problem prior to customer even attempting to contact the company/brand based on the data. This approach raises the user experience beyond what can be achieved with the traditional approaches.

In one arrangement, based on the user's response 186 to the next best action 184, the intent prediction engine 127 can provide response data 174 (logs, call records, chat interactions, etc.) to the framework 168 to reinforce the prediction model 170. For example, the intent prediction engine 127 can generate a training vector 176 which includes information from the user interaction data 130 along with the response data 174 as the "intent" portion of the vector (e.g., <date/time/season, "Billing," locality of the callers, number of callers for intent in the queue, de-queue rate, external sources (social network, weather channel), user (behavior) information, >). The intent prediction engine 127 provides this updated training vector 176 to the framework 168 which, in turn, can update the prediction model 170 based upon the vector 176. Accordingly, the intent prediction engine 127 includes a custom feedback loop that allows the framework 168 to improve its decision making process over time.

As provided above, the user 122 can provide user interaction data 130 to the contact center apparatus 112 to identify some aspect of the user 122 or the user's interaction with the contact center 100. The contact center 100 is configured to handle the user interaction data 130 provided by a user 122 in a variety of ways. For example, based upon the user interaction data 130 received, the contact center 100 can direct the user 122 directly to the intent recognition engine 125, directly to the intent prediction engine 127, or sequentially to the intent recognition engine 125 and to the intent prediction engine 127.

In one arrangement, the contact center 100 can direct the user interaction data 130 to the intent recognition engine 125 when the contact center apparatus 112 initially fails to recognize an intent associated with the user interaction data 130 received from the user 122. For example, assume the case where the user interaction data 130 includes the user 122 providing, as voice data, the phrase "I want to pay my bill." In the case where the contact center apparatus 112 identifies the user 122 as being unrecognized (e.g., there is no data identifying the user 122 in the database 114), the contact center apparatus 112 directs the user interaction data 130 to the intent recognition engine 125, which is language driven, to identify the intent 154 associated with the user interaction data 130, such as described above. As a result of identifying the user's intent 154 as "pay bill", the chatbot 158 can respond to the user with an intent-associated response, such as "Would you like to pay your bill?".

In one arrangement, the contact center 100 can direct the user 122 to the intent prediction engine 127 when the contact center apparatus 112 knows why the user 122 is calling and can identify the next steps needed without further inquiry. The intent prediction engine 127 is data driven and can mine user data 169 from the database 114 to provide the predicted response. For example, assume the case where the user interaction data 130 includes the user 122 providing, as voice data, the phrase "I want to pay my bill." In the case where the contact center apparatus 112 identifies the user 122 as being recognizable to the contact center 100 (e.g., there is data identifying the user 122 in the database 114), the contact center apparatus 112 can direct the user interaction data 130 to the intent prediction engine 127. In response to receiving the user interaction data 130, the intent prediction engine 127 can predict the response, based upon the intent 154 identified by the user interaction data 130. For example, the intent prediction engine 127 can review the database 114 to identify that the user 122 usually pays his bill with AMERICAN EXPRESS (AMEX). As a result, the intent prediction engine 127 can generate and transmit a response of "Do you want to pay using AMEX?" based upon the user data in the database 114.

In one arrangement, the contact center 100 can direct the user 122 sequentially to the intent recognition engine 125 and to the intent prediction engine 127, such as in the case where the contact center apparatus 112 can identify the user 122 as being recognized (e.g., there is data identifying the user 122 in the database 114) but is configured to optimize the user's experience by providing a next best action 184.

While various embodiments of the innovation have been particularly shown and described, it will be understood by those skilled in the art that various changes in form and details may be made therein without departing from the spirit and scope of the innovation as defined by the appended claims.

What is claimed is:

1. In a contact center apparatus, a method for recognizing user intent associated with user interaction with the contact center apparatus, comprising:
receiving user interaction data;
performing a feature extraction process on the user interaction data to generate feature data;
performing an intent extraction operation on the feature data to extract topics included with the feature data;

executing a classification engine on the topics extracted from the feature data to classify a user intent associated with the user interaction data;
performing an intent prediction operation on the user interaction data to generate an intent prediction, comprising:
transforming the user interaction data into a prediction vector having the format <date/time/season, locality of the user, number of users for intent in a queue, de-queue rate, external source information, user information>;
providing the prediction vector and a prediction model to a framework; and
receiving the intent prediction and a confidence score from the framework based upon the prediction vector and the prediction model;
generating a next best action based upon the intent prediction and a confidence score, the next best action configured as an automated action performed by the contact center apparatus to act on the intent prediction, the next best action including an advertisement directed toward the user; and
providing the next best action to the user.

2. The method of claim 1, wherein extracting features from the user interaction data comprises:
utilizing a data cleansing engine to reduce the size of the data set included in the user interaction data and to generate cleansed user interaction data; and
applying a feature importance engine to the cleansed user interaction data to identify statistically important words associated with the user interaction data.

3. The method of claim 1, wherein performing the intent extraction operation on the feature data comprises applying Gensim's Latent Dirichlet Allocation (LDA) model to the feature data to extract topics included with the feature data.

4. The method of claim 1, wherein executing the classification engine further comprises confirming an accuracy of the classification of the topics extracted from the feature data and associated with the user interaction data.

5. The method of claim 1, further comprising, in response to receiving a user response to the next best action, providing response data to the framework to reinforce the prediction model.

6. In a contact center apparatus, a method for predicting user intent associated with user interaction with the contact center apparatus, comprising:
receiving user interaction data;
transforming the user interaction data into a prediction vector having the format <date/time/season, locality of the user, number of users for intent in a queue, de-queue rate, external source information, user information>;
providing the prediction vector and a prediction model to a framework;
receiving an intent prediction and a confidence score from the framework based upon the prediction vector and the prediction model;
generating a next best action based upon the intent prediction and a confidence score, the next best action configured as an automated action performed by the contact center apparatus to act on the intent prediction, the next best action including an advertisement directed toward the user; and
providing the next best action to the user.

7. The method of claim 6, further comprising, in response to receiving a user response to the next best action, providing response data to the framework to reinforce the prediction model.

8. A contact center apparatus, comprising:
a controller having a processor and a memory, the controller configured to:
receive user interaction data;
perform a feature extraction process on the user interaction data to generate feature data;
perform an intent extraction operation on the feature data to extract topics included with the feature data;
wherein when performing the intent prediction operation on the user interaction data the controller is configured to:
transform the user interaction data into a prediction vector having the format <date/time/season, locality of the user, number of users for intent in a queue, de-queue rate, external source information, user information>;
provide the prediction vector and a prediction model to a framework; and
receive the intent prediction and a confidence score from the framework based upon the prediction vector and the prediction model;
execute a classification engine on the topics extracted from the feature data to classify a user intent associated with the user interaction data;
perform an intent prediction operation on the user interaction data to generate an intent prediction;
generate a next best action based upon the intent prediction and a confidence score, the next best action configured as an automated action performed by the contact center apparatus to act on the intent prediction, the next best action including an advertisement directed toward the user; and
provide the next best action to the user.

9. The contact center apparatus of claim 8, wherein when extracting features from the user interaction data, the controller is configured to:
utilize a data cleansing engine to reduce the size of the data set included in the user interaction data and to generate cleansed user interaction data; and
apply a feature importance engine to the cleansed user interaction data to identify statistically important words associated with the user interaction data.

10. The contact center apparatus of claim 8, wherein when performing the intent extraction operation on the feature data, the controller is configured to apply Gensim's Latent Dirichlet Allocation (LDA) model to the feature data to extract topics included with the feature data.

11. The contact center apparatus of claim 8, wherein when executing the classification engine the controller is further configured to confirm an accuracy of the classification of the topics extracted from the feature data and associated with the user interaction data.

12. The contact center apparatus of claim 8, wherein the controller is further configured to, in response to receiving a user response to the next best action, provide response data to the framework to reinforce the prediction model.

13. A contact center apparatus, comprising:
a controller having a processor and a memory, the controller configured to:
receive user interaction data;
transform the user interaction data into a prediction vector having the format <date/time/season, locality of the user, number of users for intent in a queue, de-queue rate, external source information, user information>;
provide the prediction vector and a prediction model to a framework;

receive an intent prediction and a confidence score from the framework based upon the prediction vector and the prediction model;

generate a next best action based upon the intent prediction and a confidence score, the next best action configured as an automated action performed by the contact center apparatus to act on the intent prediction, the next best action including an advertisement directed toward the user; and provide the next best action to the user.

14. The contact center apparatus of claim 13, wherein the controller is further configured to, in response to receiving a user response to the next best action, provide response data to the framework to reinforce the prediction model.

* * * * *